US 10,420,095 B2

United States Patent
Lindoff et al.

(10) Patent No.: US 10,420,095 B2
(45) Date of Patent: Sep. 17, 2019

(54) DATA TRANSMISSION CONTROL

(71) Applicant: Telefonaktiebolaget L M Ericsson (publ), Stockholm (SE)

(72) Inventors: Bengt Lindoff, Bjarred (SE); Leif Wilhelmsson, Dalby (SE); Anders Wallen, Ystad (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 261 days.

(21) Appl. No.: 14/404,203

(22) PCT Filed: May 24, 2013

(86) PCT No.: PCT/EP2013/060707
§ 371 (c)(1),
(2) Date: Nov. 26, 2014

(87) PCT Pub. No.: WO2013/178541
PCT Pub. Date: Dec. 5, 2013

(65) Prior Publication Data
US 2015/0173073 A1    Jun. 18, 2015

Related U.S. Application Data

(60) Provisional application No. 61/656,770, filed on Jun. 7, 2012.

(30) Foreign Application Priority Data

Jun. 1, 2012    (EP) .................................... 12170386

(51) Int. Cl.
*H04W 72/04*    (2009.01)
*H04W 24/02*    (2009.01)
(Continued)

(52) U.S. Cl.
CPC ........ *H04W 72/0446* (2013.01); *H04B 17/26* (2015.01); *H04B 17/318* (2015.01);
(Continued)

(58) Field of Classification Search
CPC ............. H04W 24/02; H04W 72/0446; H04W 52/0216; H04W 52/0229; H04W 52/254;
(Continued)

(56) References Cited

U.S. PATENT DOCUMENTS 6,907,044 B1 * 6/2005 Yonge, III ............ H04W 74/02
370/445
9,198,142 B2 * 11/2015 Zhou ................... H04W 52/343
(Continued)

FOREIGN PATENT DOCUMENTS

CN    101136667 A    3/2008
CN    101523752 A    9/2009
(Continued)

OTHER PUBLICATIONS

Extended European Search Report, dated Sep. 12, 2014, in connection with European Patent Application No. 12170386.2-1246, all pages.
(Continued)

*Primary Examiner* — Ricky Q Ngo
*Assistant Examiner* — Ellen A Kirillova
(74) *Attorney, Agent, or Firm* — Leffler Intellectual Property Law, PLLC (57) ABSTRACT

A method of controlling data transmission of a transceiver is disclosed. The method comprises determining that data is pending for transmission by the transceiver and receiving a signal. A current required transmission effort for transmission of the data is estimated based on the received signal and it is determined if data transmission is to be initiated based on the estimated current required transmission effort,
(Continued)

required transmission effort statistics and a time criterion associated with the data. Transmission of the data is initiated if it is determined that so should be done and otherwise the decision of transmitting the data is postponed. Corresponding computer program product, processor, arrangement and wireless communication device are also disclosed.

14 Claims, 3 Drawing Sheets

(51) Int. Cl.
| | |
|---|---|
| *H04W 52/24* | (2009.01) |
| *H04L 12/823* | (2013.01) |
| *H04W 52/02* | (2009.01) |
| *H04B 17/26* | (2015.01) |
| *H04B 17/318* | (2015.01) |
| *H04B 17/373* | (2015.01) |
| *H04B 17/382* | (2015.01) |

(52) U.S. Cl.
CPC ......... *H04B 17/373* (2015.01); *H04B 17/382* (2015.01); *H04L 47/32* (2013.01); *H04W 24/02* (2013.01); *H04W 52/0216* (2013.01); *H04W 52/0229* (2013.01); *H04W 52/245* (2013.01); *H04W 72/0473* (2013.01); *H04W 52/242* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/21* (2018.01); *Y02D 70/26* (2018.01)

(58) Field of Classification Search
CPC ............. H04W 72/0473; H04B 17/373; H04B 17/382; H04B 17/318; H04B 17/26; H04L 47/32
USPC ........................................................ 370/329
See application file for complete search history.

(56) References Cited

U.S. PATENT DOCUMENTS

| | | | |
|---|---|---|---|
| 2004/0204183 A1* | 10/2004 | Lencevicius | H04M 1/663 455/574 |
| 2005/0063356 A1* | 3/2005 | Larsen | H04L 43/08 370/351 |
| 2006/0068822 A1 | 3/2006 | Kalhan | |
| 2006/0104219 A1* | 5/2006 | Kennedy | H04L 41/08 370/254 |
| 2006/0104301 A1* | 5/2006 | Beyer | H04J 3/0667 370/445 |
| 2006/0233200 A1* | 10/2006 | Fifield | H04L 1/188 370/473 |
| 2006/0270385 A1 | 11/2006 | Morris | |
| 2008/0273464 A1* | 11/2008 | Allen | H04L 47/12 370/235 |
| 2009/0093281 A1 | 4/2009 | Demirhan et al. | |
| 2009/0325512 A1 | 12/2009 | Granlund et al. | |
| 2011/0081875 A1 | 4/2011 | Imamura et al. | |
| 2011/0085566 A1* | 4/2011 | Bucknell | H04L 47/10 370/412 |
| 2012/0008573 A1* | 1/2012 | Shiva | H04W 72/1252 370/329 |
| 2012/0129564 A1* | 5/2012 | De La Cropte De Chanterac | H04W 52/0245 455/522 |

FOREIGN PATENT DOCUMENTS

| | | |
|---|---|---|
| CN | 102307147 A | 1/2012 |
| EP | 2 395 811 A2 | 12/2011 |
| EP | 2395811 A2 | 12/2011 |

OTHER PUBLICATIONS

PCT International Search Report, dated Jul. 9, 2013, in connection with International Application No. PCT/EP2013/060707, all pages.
PCT Written Opinion, dated Jul. 9, 2013, in connection with International Application No. PCT/EP2013/060707, all pages.
Chinese Office Action dated Dec. 3, 2015 in connection with CN Application No. 201380040770.2, 5 pages.
English language translation of Chinese Office Action dated Dec. 3, 2015 in connection with CN Application No. 201380040770.2, 7 pages.

\* cited by examiner

DATA TRANSMISSION CONTROL

CROSS-REFERENCE TO RELATED APPLICATIONS

This application claims priority under 35 U.S.C. § 119 to European Patent Application No. 12170386.2, filed Jun. 1, 2012, which is hereby incorporated herein by reference in its entirety. This application also claims the benefit of US Provisional Application 61/656,770, filed Jun. 7, 2012, which is hereby incorporated herein by reference in its entirety.

TECHNICAL FIELD

The present invention relates generally to the field of control of data transmission. More particularly, it relates to control of data transmission in power and/or energy restricted applications.

BACKGROUND

In wireless communication, the success of data transmission is typically related to the power and/or energy used for transmission. For example, a data message transmitted using a high power typically has a better chance of reaching the intended receiver in a detectable and readable condition than has the same data message transmitted using a lower power.

On the other hand, in multiuser systems it is typically beneficial if transmissions are not made using a higher power than necessary.

Thus, there is typically an interval or a precise value relating to the transmission power that should preferably be used by a particular transmitting unit. This interval or value may typically vary with time. The variations may, for example, be due to movement of the particular transmitting unit and other units of the communication system, but may also be due to changing of other environmental conditions, such as temperature, air pressure, movement of objects in the environment, varying traffic load in the system, varying shielding of the transmitting unit, etc. Many communication standards have implemented power control protocols to provide the transmitting unit with information relating to the currently preferred transmission power.

Wireless transmitting units are typically battery powered. Thus, energy consumption is an important factor for the operation of such units. This may be particularly important when considering machine type communications (MTC), i.e. communication between units where no human interaction is directly involved in the communication.

Machine Type Communication, sometimes also referred to as Machine-to-Machine (M2M) communication, is expected to be utilized for a huge variety of applications. For many of these applications, one or more of the units involved should preferably be able to function without any service (e.g. battery change or battery charging requiring human interaction) for long periods of time (e.g. months, years or even decades). Furthermore, it may be desirable to run such units using small and/or standard of-the-shelf batteries (such as coin cell batteries) and/or using e.g. solar energy from a small size solar panel.

US 2006/0270385 discloses a method for controlling data transmission based on power cost. A power cost per unit data associated with successfully sending data is determined. The determined power cost per unit data is compared to a threshold, and transmission of data is delayed based on a determination that the power cost per unit data exceeds the threshold. The data transmission is delayed until the power cost per unit data is below a threshold. The power consumption rate used for determining the power cost per unit data may be obtained by measuring a power consumption rate associated with the transmission of data, and/or by using a closed loop power control scheme where a received signal strength indicator of a data transmission is measured at a receiver of the data transmission and provided to the transmitter to be used to set a signal strength for the transmitted signal.

US 2012/0129564 A1 discloses a communication device adapted to determine a measured network condition associated with transmitting an initial communication and to determine a power consumption of the initial communication based on a measured network condition value. The power consumption of the initial communication is compared with a predetermined power consumption value and communication is terminated if the power consumption of the initial communication exceeds the predetermined power consumption value.

However, when no data has been transmitted recently, the power consumption rate cannot be reliably determined according to these methods. Furthermore, it would be desirable to even further reduce the energy consumption and to provide for an implementation that is functional also where no closed loop power control protocol is applicable.

Therefore, there is a need for methods and arrangements for improved transmission control and in particular for applications having tough power/energy constraints.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide methods and arrangements for improved transmission control.

According to a first aspect, a method of controlling data transmission of a transceiver is provided. The method comprises determining that data is pending for transmission by the transceiver and receiving a signal. The method also comprises estimating a current required transmission effort for transmission of the data based on the received signal and determining if data transmission is to be initiated based on the estimated current required transmission effort, required transmission effort statistics and a time criterion associated with the data. The method further comprises initiating transmission of the data if it is determined that data transmission is to be initiated, and postponing a decision of transmitting the data otherwise.

The data may, for example, originate from a data source and may be pending for transmission in a data transmission buffer associated with the transceiver. The data source may be one or more sensors and the data may be sensor data generated by the one or more sensors.

The transmission effort may, for example, be represented by a required power consumption for transmission of (at least part of) the data and/or a required energy consumption for transmission of (at least part of) the data. The required power and/or energy consumption may be a required output transmission power/energy or may be a total required transmission power/energy (i.e. a total power/energy consumption by a device for performing the transmission).

The signal may be a dedicated signal or a non-dedicated (e.g. common, shared) signal. For example, the signal may be a dedicated random access response signal or a closed loop power control signal. A non-dedicated signal may, for example, be a reference signal such as a common reference signal (e.g. CPICH—Common Pilot Channel, CRS—Common Reference Symbol) or a synchronization signal.

In some embodiments, the required transmission effort statistics may comprise historical required transmission effort estimations and/or an estimated distribution (or density) function of required transmission effort. In some embodiments, the method further comprises determining the required transmission effort statistics based on, for example, channel characteristics. The channel characteristics may comprise a statistical channel model. Determining the required transmission effort statistics may be based on historically estimated required transmission effort values.

In some embodiments, the time criterion may comprise a time window or a time horizon extending into the future and having a certain length. The certain length may, for example, be an accepted transmission delay associated with the data (may be different for different pieces of pending data) minus a pending time of the data (may also be different for different pieces of pending data). The time criterion may be different for different parts of the pending data (e.g. due to different accepted transmission delays and/or different pending times).

Initiating transmission of the data may comprise transmitting the data directly or further evaluating the required transmission effort (e.g. by initiating request procedure, a probing process, a random access process, etc).

In some embodiments, determining if data transmission is to be initiated comprises comparing a first metric with a first threshold, wherein the first metric is based on the estimated current required transmission effort and the first threshold is based on the required transmission effort statistics and the time criterion. It may be determined that data transmission is to be initiated if the first metric falls on a first side of the first threshold.

According to some embodiments estimating the current required transmission effort for transmission of the data based on the received signal comprises estimating a required transmission power for transmission of the data based on the received signal.

In such embodiments, the required transmission power for transmission of the data based on the received signal may be estimated by measuring a received power of the received signal, and estimating a path loss associated with reception of the signal based on the measured received power and a transmission power of the signal. A path loss associated with transmission of the data may be estimated based on the estimated path loss associated with reception of the signal, and the required transmission power for transmission of the data may be estimated based on the estimated path loss associated with transmission of the data. The transmission power of the signal may be explicitly known or may be according to an assumed or estimated value. Any known or future suitable methods for acquiring the transmission power of the signal may be used.

In some embodiments, estimating the current required transmission effort for transmission of the data based on the received signal comprises estimating a required transmission energy for transmission of the data based on the received signal. For example, a required transmission energy may be estimated based on an estimated required transmission power and a size of the data pending for transmission.

Postponing the decision of transmitting the data may comprise making a decision to not initiate transmission of the data and, at a subsequent point in time instant, making a new decision. Thus, postponing the decision of transmitting the data may, for example, comprise iterating the described process at a subsequent point in time. The subsequent point in time may be defined such that the process is iterated at (regular or irregular) time instants. The time instants may be pre-determined or dynamic. For example, the time instants may depend on when the signal used for determination (e.g. a reference signal as described above or any other suitable signal) is transmitted. The time instants may, alternatively or additionally, depend on one or more of the pending time of the data, the size of the data, the size of the data buffer, etc. The process may be iterated until there is no data pending for transmission. The subsequent point in time may be when new data arrives and becomes pending for transmission.

In some embodiments, postponing the decision of transmitting the data may comprise receiving a subsequent signal at a subsequent point in time and estimating a subsequent required transmission effort for transmission of the data based on the received subsequent signal. It may be determined if data transmission is to be initiated based on the estimated subsequent required transmission effort, the required transmission effort statistics and the time criterion associated with the data. Transmission of the data may be initiated if it is determined that data transmission is to be initiated, and a decision of transmitting the data may be further postponed otherwise.

In some embodiments, determining if data transmission is to be initiated based on the estimated subsequent required transmission effort comprises comparing a second metric with the first threshold, wherein the second metric is based on the estimated subsequent required transmission effort. It may be determined that data transmission is to be initiated if the second metric falls on a first side of the first threshold.

In some embodiments, determining if data transmission is to be initiated based on the estimated subsequent required transmission effort comprises comparing a third metric with a third threshold, wherein the third metric is based on the estimated subsequent required transmission effort and the third threshold is based on the required transmission effort statistics and the time criterion. It may be determined that data transmission is to be initiated if the third metric falls on a first side of the third threshold.

According to some embodiments, the method further comprises, before the signal is received, setting an initial transmission power and transmitting a request signal using the initial transmission power. Receiving a signal may then comprise receiving a response signal relating to the request signal, and the current required transmission effort for transmission of the data may be estimated based on the received response signal.

In some embodiments, initiating transmission of the data if it is determined that data transmission is to be initiated may comprise setting an initial transmission power and transmitting a request signal using the initial transmission power. The method may also comprise receiving a response signal relating to the request signal and estimating a new current required transmission effort for transmission of the data based on the received response signal. It may be determined if the data is to be transmitted based on the estimated new current required transmission effort, the required transmission effort statistics and the time criterion associated with the data. Transmission of the data may take place if it is determined that the data is to be transmitted, and the decision of transmitting the data may be postponed otherwise.

The initial power may, for example, be set to a predetermined value, to a value associated with a previous data transmission (e.g. the same power as previously used or a number of dB lower), or to a value associated with a previously estimated current required transmission effort (e.g. equal to an estimated current required transmission power).

The request signal may be re-transmitted using increasing transmission power until the response signal is received or a stop condition is reached according to some embodiments. The stop condition may be a maximum allowed power and/or a maximum number of re-transmissions, for example.

The request signal may be a random access signal and the response signal may be a random access response signal.

In some embodiments, estimating the new current required transmission effort for transmission of the data based on the received response signal may be based on the transmission power used for a most recent transmission of the request signal and a power control command comprised in the response signal.

In some embodiments, postponing the decision of transmitting the data may comprise discarding data having a pending time exceeding a second threshold. The second threshold may be static or dynamically adaptive depending on, for example, the amount of pending data, the time and/or date of the data, etc.

One or more of the first, second and third metric may be equal to the estimated (new) required transmission power or to the estimated (new) required transmission energy, for example. The transmission of the data may be initiated if the respective metric does not exceed the respective threshold and the decision of transmitting the data may be postponed if the respective metric exceeds the respective threshold.

One or more of the first and third threshold may be static or dynamically adaptive. The first and/or third threshold may be increased in relation to an increase of a pending time of the data. Additionally or alternatively, the first and/or third threshold may be is decreased in relation to a decrease of an energy level (e.g. a charge level) of a battery (or a current availability of energy supply from e.g. a solar panel) associated with the transceiver.

One or more of the first, second and third metric and the first and third threshold may depend on one or more of the required transmission effort statistic and the time criterion.

Threshold dependency may, for example, be determined from at least one of the application layer in the MTC, signals from the network, or UE capability according to an applicable standard.

It is noted that different parts of the data may have arrived at a buffer at different times and thus have different age (pending time). An accepted transmission delay associated with the data may also differ between different parts of the data. Transmission of data may comprise transmission of all the pending data or only part of the pending data. The order of transmission and various parameters (e.g. thresholds) may depend on these variations among the different parts of data.

A second aspect is a computer program product comprising a computer readable medium, having thereon a computer program comprising program instructions. The computer program is loadable into a data-processing unit associated with a transceiver and adapted to cause execution of the method according to the first aspect when the computer program is run by the data-processing unit.

A third aspect is a processor adapted to control data transmission of a transceiver. The processor comprises a controller and an estimator. The controller is adapted to cause the transceiver to receive a signal in response to a determination that data is pending for transmission by the transceiver, and determine if data transmission is to be initiated based on an estimated current required transmission effort, required transmission effort statistics and a time criterion associated with the data. The controller is also adapted to initiate transmission of the data if it is determined that data transmission is to be initiated, and postpone a decision of transmitting the data otherwise. The estimator is adapted to estimate the current required transmission effort for transmission of the data based on the received signal. The processor and its modules (e.g. the controller and the estimator) may be implemented in hardware or software or a combination thereof.

In a fourth aspect and arrangement is provided comprising a transceiver, a data buffer adapted to buffer data pending for transmission by the transceiver and the processor of the third aspect.

The arrangement may further comprise a data source adapted to provide data for transmission by the transceiver.

The arrangement may be connectable to a battery and adapted to be powered by the same.

A fifth aspect is a wireless communication device comprising the arrangement according to the fourth aspect.

In some embodiments, the third, fourth and fifth aspects may additionally have features identical with or corresponding to any of the various features as explained above for the first aspect.

An advantage of some embodiments is that by using a dynamic decision criterion that is not only based on the current conditions, an effort required for transmission of data may be minimized. By considering the estimated currently required effort in combination with channel statistics (e.g. historical required effort estimations), it can be determined whether or not the current conditions are the best to be expected within a time window.

A transmission decision based on such a determination typically results in a lower transmission effort (e.g. energy and/or power) than a decision based on the current conditions only.

Furthermore, this approach is typically more robust than an approach based on the current conditions only, because in bad channel conditions it may be determined by this approach that the current channel conditions (even if not particularly good) are the best to be expected in a near future and a decision may be made to transmit particularly important data even if the effort may be higher than otherwise accepted. Such data might be lost under similar channel conditions if only current conditions where considered.

Another advantage of some embodiments is that the required transmission power can be reliably determined even without a closed loop power control protocol. Thus, no standardized protocol is required and function is guaranteed in a larger variety of communication systems. Furthermore, no unnecessary energy is wasted for the power control signaling.

Another advantage of some embodiments is that the required transmission power can be reliably determined even when no recent data transmission has taken place. This is particularly advantageous in applications with non-frequent data transmission. It is also particularly advantageous when the transmitting unit is often in an environment requiring a high transmission power and/or when the transmitting unit is in an environment requiring a high transmission power for long periods of time. Thus, it need not waste any unnecessary power when trying to transmit under these circumstances to determine the required transmission power.

A further advantage of some embodiments is that power is saved by not transmitting data that is obsolete. This is achieved by postponing, if the required power (or energy) is too high, the decision regarding whether to transmit data or not.

A further advantage of some embodiments is that power is saved by not requiring signaling dedicated to the transmitting unit to determine the required transmission power, as it may be determined based on reception of non-dedicated/common signaling.

Yet a further advantage of some embodiments is that the required transmission effort may be estimated even when the (average or momentary) path losses in the uplink and downlink are not equal or similar. This advantage can, for example, be achieved for the embodiments where a request signal is transmitted and a response signal relating to the request signal is received and used for the required transmission effort estimation.

Thus, by selecting the time for transmission adequately (and by using adequate selection means) power and/or energy consumption may be decreased.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where, if data is pending for transmission by a transceiver, a required transmission effort (e.g. power and/or energy) is estimated. The required transmission effort is used to determine whether data transmission should be initiated or if the decision regarding data transmission should be postponed.

The embodiments discussed herein are particularly useful in situations when the data pending for transmission does not require high quality of service (QoS), for example in terms of high data rate transmission and/or low latency/real time transmission.

The embodiments are also particularly beneficial for applications where transmission takes place under (more or less severe) power and/or energy consumption constraints.

In an approach based on only the current conditions, transmission typically takes place when the channel is sufficiently good (e.g. based on a threshold). However, in some scenarios the channel might be even better at a future time instant. Thus, if a probability of the channel becoming better during a near future is taken into account, an even lower power consumption could be achieved.

In some scenarios, using an approach based on only the current conditions, the channel might be so bad that sufficiently good (e.g. based on a threshold) channel conditions might not be reached at all within a reasonable time horizon for data transmission. Thus, if a probability of the channel becoming better during a near future is taken into account, the condition (e.g. threshold) for transmitting may be relaxed to enable transmission of critical data.

Hence, the embodiments may be particularly beneficial when based not only on the current conditions.

Studying a typical power consumption of a transmitter circuit as a function of the emitted transmission output power for a cellular modem reveals that for a low output power (e.g. <5 dBm) the circuit power consumption is rather constant. This may typically be due to that, for these output power levels, the energy consumption of major power drainers of the circuit (e.g. biasing of the power amplifier, baseband processing, analog/digital front end processing, etc) is related to the output power level to a very low or even no extent. For high output power levels the circuit power consumption increases significantly (approximately exponentially in some examples). In one study, the circuit power consumption when transmitting at 23 dBm was 16 times higher compared to when transmitting at 5 dBm. Thus, when transmitting under energy constraints it may be vital to not transmit unnecessarily when a high output power is required.

According to some embodiments such behavior is taken into account. If the transmitting device estimates a high required transmission power, it is typically better to wait and transmit the pending data at a later time instant when the required transmission power is expected to be lower. In a scenario with a moving transmission device (for example a sensor in a car, a container, an airplane, a bike, etc) the path loss to the closest network node is typically varying. Hence, it is likely that the device at some time instant will be close to a network node, and thus require low power for data transmission. A stationary device (for example a sensor fixed at a certain geographical location) may also experience varying radio conditions. For example due to movement of other units of the communication system, or changing of other environmental conditions (such as temperature, air pressure, movement of objects in the environment, varying traffic load in the system, varying shielding of the transmitting unit, etc). Thus, similar considerations may be applicable to stationary devices also.

One example where embodiments as disclosed herein may be useful is machine type communications, but some embodiments are also applicable in any communication of non-time critical data.

Embodiments may be described with reference to particular signaling of a communication standard such as 3GPP UMTS or LTE. It should be noted that such references are merely for exemplification and are intended to make the description of embodiments clearer. The principles described herein may be applied to any suitable communication system. Examples thereof include, but are not limited to, 3GPP UMTS, 3GPP LTE, IEEE 802.11 and Bluetooth.

In some embodiments, the required transmission effort (for example, a required transmission power and/or energy) is estimated based on a received signal.

The signal may be any suitable signal of the applicable communication system whereof at least one parameter may be determined (e.g. measured, decoded, etc). In some embodiments, the signal may have a known or determinable transmission power. The signal may be a dedicated signal targeting a specific device or a non-dedicated (e.g. common, shared) signal targeting more than one device. A dedicated signal may, for example, be a random access response signal or a closed loop power control signal. A non-dedicated signal may, for example, be a reference signal such as a common reference signal (e.g. a common pilot signal of 3GPP UMTS: CPICH—Common Pilot Channel, a common reference signal of 3GPP LTE: CRS—Common Reference Symbol) or a synchronization signal (e.g. SCH/PCH of 3GPP UMTS and 3GPP LTE). In the following, a reference signal is used for illustration purposes, but this is not to be interpreted as limiting.

In some embodiments, the signal strength of the received signal is measured and the estimation of the required transmission effort is based on that measurement. Examples of signal strength measurements comprise RSSI (received signal strength indication), RSCP (received signal code power), RSRP (reference signal received power), etc. Alternatively or additionally, some embodiments measure the quality of the received signal. Examples of quality measurements comprise SIR (signal-to-interference ratio), SNR (signal-to-noise ratio), RSRQ (reference signal received quality), etc.

In some embodiments, the estimation of the required transmission effort is based on a reception of a random access response signal. For example, when a random access response has been received, it may be an implicit indication that the power used for transmission of the corresponding random access request was adequate, and that power value (or a related value) may be used as the required transmission effort estimation. Alternatively or additionally, a transmit power control command comprised in the random access response signal may be decoded and used to estimate the required transmission effort.

Figure 1:
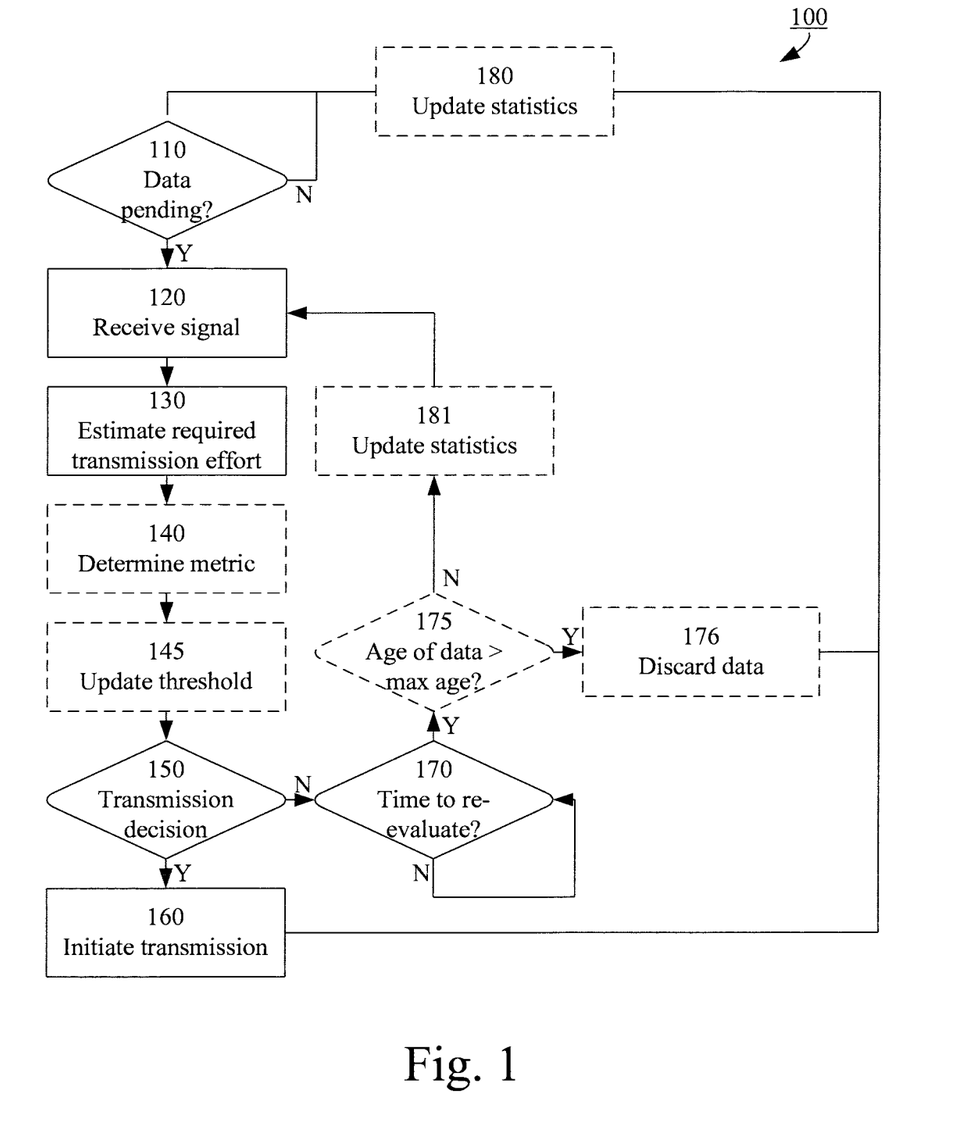
FIG. 1 is a flowchart illustrating example method steps according to some embodiments.

FIG. 1 illustrates an example method 100 of controlling data transmission of a transceiver. The method starts in 110, where it is determined whether or not there is data pending for transmission. The data may be pending for transmission by presence in a data transmission buffer associated with (e.g. integral to or connected to) the transceiver.

If there is no data pending for transmission (NO path out from 110), the method is put on hold and waits until there is data pending.

If there is data pending for transmission (YES path out from 110), the method continues to 120 where a signal (e.g. a reference signal) is received by the transceiver. To lower the power consumption of the transceiver, the reception of 120 may take place at a time instant when the transceiver is turned on in any case, e.g. for receiving a paging or synchronization signal. Alternatively, the reception 120 may take place as soon as it has been determined that data is pending for transmission.

Based on the reference signal reception in 120, a required effort (e.g. power and/or energy) for transmitting the pending data is determined in 130.

In a system where the same carrier frequency is used in both uplink and downlink (e.g. a TDD—time division duplex—system) the downlink path loss typically gives full information of the path loss for the uplink. However, in a system where uplink and downlink uses different carrier frequencies (e.g. an FDD—frequency division duplex—system) this is not a certainty. In such systems, the average downlink path loss can typically be estimated from the average uplink path loss. (Typically, the uplink is at a lower frequency, which makes the average path-loss slightly smaller in the uplink). Due to fading, the momentary uplink and downlink path losses can differ somewhat. In some embodiments, these assumptions in the estimation of the required transmission effort are utilized.

In some embodiments, a power estimation in 130 may be based on the received signal strength of the reference signal only. For example, a low received signal strength of the reference signal might indicate that a high transmission power is required.

In some embodiments, a power estimation in 130 may be based on an assumption that the path loss associated with transmission of the data (e.g. an uplink path loss) is the same or similar to the path loss associated with reception of the reference signal (e.g. a downlink path loss) as indicated above. In some embodiments, the power estimation may be based on knowledge of the path loss difference between the path loss associated with transmission of the data and the path loss associated with reception of the reference signal.

In these various embodiments, the received power of the reference signal is measured at the transceiver. The path loss associated with reception of the reference signal is estimated as the discrepancy between the known, estimated or assumed transmission power of the reference signal and the measured received power of the reference signal. In some applications, information regarding the transmission power of the reference signal may be received from the network in e.g. a (broadcast or unicast) message. Then, the path loss associated with transmission of the data may be estimated as being the same as the path loss associated with reception of the reference signal. Alternatively, the path loss associated with transmission of the data may be estimated from the path loss associated with reception of the reference signal and a known path loss difference. Finally, the required transmission power is estimated based on the estimated path loss associated with transmission of the data and a known, estimated, or assumed required reception power, in the remote network node, for the data. In some scenarios, the required reception power may be signaled by the network. In some scenarios, the required reception power may be estimated based on a transmission format (e.g. modulation and coding) used for the transmission. In such embodiments, the transmission format is an indication of the SNR required for reception of the data (for example for correct decoding of the data or for meeting a target bit error rate). The relation between the transmission format and the required SNR may be known from, for example, a look-up table, simulations, etc. Based on that knowledge and an estimate of the noise figure of the remote network node receiver, the required transmission power may be estimated. The noise figure of the remote network node receiver may, for example, be estimated based on success rate statistics from earlier transmissions.

If the required transmission power has been estimated in 130, it is optional to also estimate the required energy for transmission of (at least some of) the data. For example, the required energy may be estimated as the required power multiplied with a time required to transmit the data. The required time may be based on a data rate and the size of the data pending for transmission. In some embodiments, the data may be partitioned into blocks (for example based on how long time various data has been pending). In such embodiments, the size of only one or more of the blocks (e.g. the oldest ones) may be used in the energy estimation. In some embodiments, the estimation of the required transmission energy may be based on a selected transmission (e.g. modulation and coding) format.

In some embodiments, the required energy for transmission of (at least some of) the data is estimated directly in 130, without first estimating the required transmission power. For example, if the data is transmitted in blocks having a fixed size, it may be tabulated how a received signal power corresponds to a required transmission energy value. If the data is transmitted in blocks having one of a number of fixed sizes, it may be tabulated how a received signal power corresponds to a required transmission energy value for each of the fixed sizes. In such embodiments, the block size may be chosen based on the received signal power, e.g. to optimize the energy consumption while providing an acceptable quality of service.

In one example, the transmission format may not be known, and it may be tabulated how a received signal power corresponds to a required transmission energy value for each of the transmission formats. Once the transmission format is known, the required transmission energy can be translated into a required transmission power if desirable.

When a required transmission power and/or energy has been estimated, it may be compensated to encompass not only the output power and/or energy but the entire power and/or energy needed by the transceiver for transmission of the data.

In 150, a determination is made whether data transmission is to be initiated or not. The determination is based on the estimated required transmission effort. The determination is further based on a time criterion associated with the data and statistics associated with the required transmission effort. The determination typically assesses—based on the statistics—whether or not it is likely that the channel will become better than it is currently (i.e. if a lower required transmission effort will be sufficient) while the time criterion is fulfilled.

For example, a channel model (or at least knowledge of channel variations) may be known or estimated and may correspond to the required transmission effort statistics. In some embodiments, the required transmission effort statistics may be based on historically estimated the required transmission efforts and/or historical signal strength measurements. Determination and updating (see e.g. 180, 181) of the required transmission effort statistics may be performed by the transceiver itself or by a module associated with the transceiver, for example.

Thus, knowledge of historical channel variations may be used to determine channel characteristics, e.g. a mathematical model of how the channel varies. The mathematical model may, for example, comprise average signal strength and a variance or similar (e.g. indicating how many dBs the channel typically varies). Examples of such models include a Rayleigh fading model and a Nakagami-m model. In some embodiments, the mathematical model may also comprise path loss models and/or models for large scale fading (e.g. a shadow model which may be log-normal distributed).

The time criterion may correspond to a future point in time (a time horizon) before which the data should be transmitted and yet be valid. In some embodiments, the time criterion comprises a time window with a length equal to an accepted delay before transmission minus a pending time (or age) of the data. Thus, some embodiments determine a probability model for the power required to transmit certain data. The probability model may be determined in the form of a distribution function, for example:

$$F(z) = P(\text{required power at time } n \text{ is less than } z).$$

An estimated required transmission power at time n may be denoted as TX(n), and it may be assumed that data need to be transmitted prior to the end of the time window at time n+T. An approach of the determination in 150 might be to initiate transmission at time n if the probability of having a better channel in the time window ]n,n+T] is lower than a threshold (e.g. having a probability threshold value between 0.1 and 0.2). If, for example, the distribution function F(z) is modeled as time-invariant and independent between different time points, and the expected required power is evaluated for T future time points, the relation between the probability and the threshold may be expressed mathematically as $$P\left(\min_{k=1\ldots T} TX(n+k) < TX(n)\right) = 1 - (1 - F(TX(n)))^T < \text{threshold}.$$

It may be further noted that the time points need not be regularly spaced, and that the expression above can be generalized to the case when e.g. there is a modeled correlation between the required power at different time points.

In another example, an approach of the determination in 150 is taken as follows. An amount of data that becomes pending for transmission at time n is denoted Δ(n), and the total amount of data pending for transmission at time n is denoted D(n). In this approach it is assumed that either all of the data is transmitted at time n (event denoted u(n)=1) or transmission is delayed (event denoted u(n)=0). It is further assumed in this example that the required energy is proportional to the amount of transmitted data. The model for the amount of pending data at time n may be expressed as $$D(n) = D(n-1)(1 - u(n-1)) + ((n),$$

and the energy required for transmission at time n as $$V(n) = D(n)TX(n)u(n),$$

where TX(n) denotes the estimated required transmission power at time n. The determination in 150 may then comprise formulating a strategy to transmit or not at time n as $$\min_{u(n)} E\left\{V(n) + \min_{u(n+k), k=1\ldots T} V(n+1)\right\},$$

where E {x} denotes the expected value of x, and T denotes the considered time horizon, which may be finite or infinite. Solving this equation to achieve u(n) can, for example, be done recursively based on dynamic programming.

In some embodiments, a metric based on the estimated required transmission effort is determined in 140. The metric may be used in the determination of 150. In some embodiments, the metric is equal to the estimated required transmission power. In other embodiments, the metric is equal to the estimated required transmission energy. In some embodiments, the metric is also based on at least one of the required transmission effort statistics and the time horizon. For example, a metric may be determined as the probability $1-(1-F(TX(n)))^T$ according to the example above.

In embodiments comprising metric determination, the decision in 150 may comprise comparing the metric to a threshold. The threshold may be static or dynamic (changing gradually or stepwise). Possibly, but not necessarily, the threshold may depend on one or more of the required transmission effort statistics and the time horizon. For example, the threshold may vary in relation to a currently remaining battery charge, a currently available energy (from e.g. a solar panel), and/or a predicted upcoming energy supply (e.g. based on current time of day in the case of a solar panel). In some embodiments, the threshold is decreased when the (current or predicted) available energy is decreased. Additionally or alternatively, the threshold may vary in relation to how long the data has been pending for transmission. In some embodiments, the threshold is increased when the pending time of the data increases. In embodiments where the data is partitioned into blocks, the threshold may be set in relation to the age of only one or more of the blocks (e.g. the oldest ones). Yet additionally or alternatively, the threshold may vary in relation to an average required transmission effort value. In some embodiments, the threshold is increased when the average required transmission effort value increases. The optional variation of a dynamic threshold is illustrated by 145 in FIG. 1.

Responsive to a determination that data transmission is not to be initiated, e.g. if the metric falls on a particular side of the threshold (NO (N) path out from 150), the decision regarding transmission of the data is postponed. For example, when the metric is equal to the estimated required power or energy, the decision is postponed if the metric exceeds the threshold. It should be noted that other suitable metrics may be used and for some metrics, the condition for postponement may be that the metric falls below the threshold.

Responsive to a determination that data transmission is to be initiated, e.g. if the metric does not fall on the particular side of the threshold (YES (Y) path out from 150), this is an indication that the required transmission power and/or energy is acceptable under the circumstances (for transmitting all or part of the data) and transmission of the data is initiated in 160. The initiation of data transmission in 160 may comprise directly transmitting the data (or part of it) using the estimated required transmission power/energy. Alternatively, the initiation of data transmission in 160 may comprise performing further evaluations first as will be described later on in relation to FIG. 2.

Postponing the decision regarding transmission of the data involves determining a time to re-evaluate the transmission conditions 170. This re-evaluation time may occur at regular time intervals. The time intervals may be fixed or may be dynamic based on aging of data and/or energy availability in a similar way as the threshold. For example, the intervals may be smaller if the data is old and/or the intervals may be longer if the available energy is low. Alternatively or additionally, the time for re-evaluation may take place at a time instant when the transceiver is turned on in any case, e.g. for receiving a paging or synchronization signal. Yet alternatively or additionally, a re-evaluation may be triggered when new data arrives and the total amount of data pending for transmission increases.

If it is determined that it is not time to re-evaluate data transmission (NO path out from 170), the method is put on hold and waits until it is time to re-evaluate.

If it is determined that it is time to re-evaluate data transmission (YES path out from 170), the method returns to 120 to receive a reference signal under the current conditions.

Optionally, the pending time of the data may be used as a stop condition. Such embodiments is particularly suitable for applications where the data (although not very time critical) becomes obsolete after some time has elapsed and there is no use in wasting power on transmitting it. For example, it may be decided that the data is obsolete since newer data has arrived, or it may simply be too old to be relevant. As an example, temperature data may be valid and relevant for quite some time, but after a few hours it may be obsolete. In another example, for some types of data only the latest value may be relevant. In yet a further example, supply levels of a manufacturing industry may be obsolete when new supplies arrive and/or supplies are consumed. Such optional considerations are represented in FIG. 1 by 175, where the age of the data is checked.

If the data is older than a maximum age (YES path out from 175), the data is discarded in 176 and the method is restarted by checking if there is any data pending in 110. In embodiments where the data is partitioned into blocks, only one or more of the blocks (e.g. the ones exceeding the maximum age) may be discarded in 176.

If the data is not older than a maximum age (NO path out from 175), the method starts the re-evaluation in 120.

The maximum age threshold may be static or dynamic. For example, there may be different thresholds for different types of data. The threshold may, alternatively or additionally, depend on the amount of pending data, the time and/or date of the data, etc. For example, supply level data of a manufacturing industry may have a larger age threshold when production is low (based on actual production or on an assumption that production is zero during night hours and weekends, for example).

The validity period of the data may be determined in different ways. For example, it may be decided on the application layer in the MTC device itself, signaled from the network, or determined via capabilities associated with different classes or categories of devices in accordance with a standard. This may, in some embodiments, also apply to how the aforementioned threshold is determined.

In some embodiments, the method includes determining and updating the required transmission effort statistics. For example, the statistics may be updated when a new required transmission effort value has been determined, as illustrated in 180, 181 of FIG. 1.

As mentioned above, the pending data may be partitioned into blocks according to some embodiments. For example, data with various life-times may be stored in the data buffer. Before transmission, the data may be sorted such that the data which is closest to being discarded is transmitted first to minimize the risk for missing data. In some embodiments, the data may be tagged so that a controller or similar can determine its origin and/or type and/or age.

An example where this approach may be useful is a sensor network, where, for instance, temperatures from a number of different sensors are collected in a hub. Then, this approach may facilitate organized and efficient data transmission from the hub to a network node. The data to be transmitted from the hub in this example may consist of a temperature value and an identification number indicating which temperature sensor each temperature value belongs to. At the hub, the temperatures from the different sensors may be ordered such that the oldest temperature in the buffer is transmitted first, and then in succeeding order.

Figure 2:
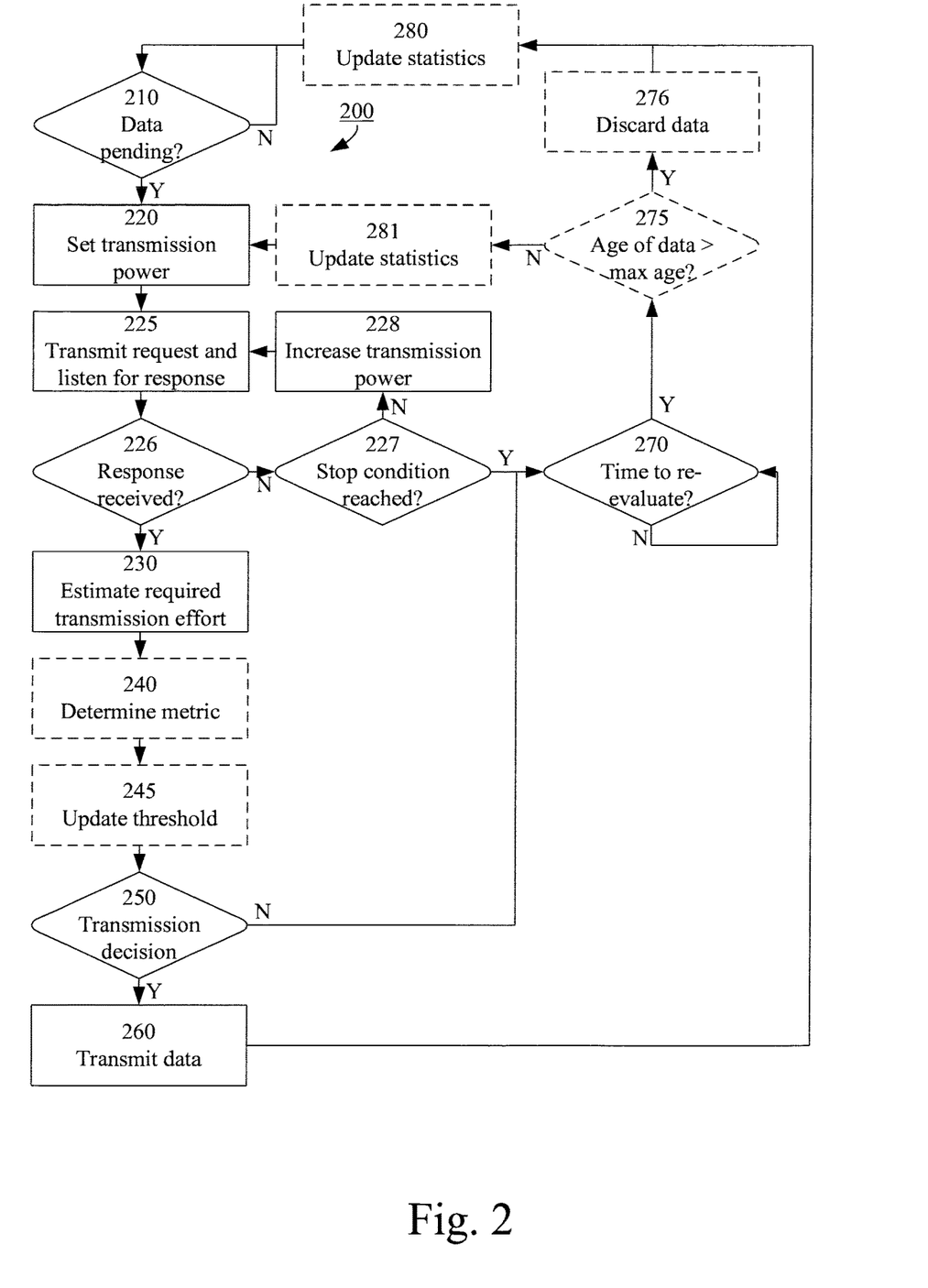
FIG. 2 is a flowchart illustrating example method steps according to some embodiments.

FIG. 2 illustrates an alternative or additional example method 200 of controlling data transmission of a transceiver.

In method 200, a random access procedure is utilized, which will now be exemplified with a description of the 3GPP UMTS (and 3GPP LTE) RACH procedure. During paging reception, a device may typically estimate the received signal strength (RSRP in LTE, RSCP in UMTS). The downlink path loss is determined, which gives a good indication of the required uplink transmission power. The RACH signal is transmitted by the device using the determined required uplink transmission power. The receiver of the device then monitors a Random Access Response (RAR) signal, which should be transmitted within a RAR window by the network node if the RACH is detected by the network node. If no RAR is detected by the device, a new RACH is transmitted at higher transmission power, and monitoring of RAR is repeated. This procedure is iterated until a RAR is received or until a stop condition is reached (e.g. a maximum transmission power, a maximum number of transmissions, or based on a timer). Once the RAR is received, the transmit power control (TPC) command which is embedded in the RAR can be decoded. The TPC command provides information about the transmission power that the network node requests the device to use for initial data transmission. It should be noted that this is just an example random access procedure. The method 200 may be applicable based on any suitable random access procedure. Receiving an explicit TPC command is not essential as will be apparent in the following.

Returning to FIG. 2, the method 200 of FIG. 2 starts in 210, where it is determined whether or not there is data pending for transmission.

If there is no data pending for transmission (NO path out from 210), the method is put on hold and waits until there is data pending.

If there is data pending for transmission (YES path out from 210), the method continues to 220 where an initial transmission power is set. The initial transmission power may, for example, be a predetermined value, a required uplink transmission power value as determined during paging reception, a value based on an earlier used transmission power, or a required transmission power value as estimated in method 100.

In 225, a request signal is transmitted using the set transmission power. The transceiver thereafter monitors the expected response signal and receives it if applicable. The request and response signals may be any signals of a random access protocol. For example, but not necessarily, the response signal may comprise an indication of which transmission power should be used by the transceiver (either as an absolute power value indication or as a differential power indication). The request signal may, for example be a random access request signal (e.g. a RACH transmission) and the response signal may, for example, be a random access grant signal (e.g. a RAR reception) comprising a TPC (transmit power control) command field.

If no response signal is received (NO path out from 226), it may be determined by a stop condition (e.g. a maximum transmission power, a maximum number of transmissions, or based on a timer) in 227 if the request signal should be transmitted again. If the stop condition is reached (YES path out from 227), the decision regarding transmission of the data is postponed. If the stop condition is not reached (NO path out from 227), the transmission power is set to an increased value in 228 and the request signal is re-transmitted in 225.

When a response signal is received (YES path out from 226), a required effort (e.g. power and/or energy) for transmitting the pending data is estimated by a determination in 230 based on the response signal. In some embodiments, a required transmission power is determined based on the indication of which transmission power should be used by the transceiver. For example, the required transmission power may be determined based on the transmission power used for the most recent request signal and a transmit power control command. In some embodiments, the required transmission power may be determined as the transmission power used for the most recent request signal adjusted as required by the transmit power control command (e.g. if the transmit power control command indicates a differential power level). In some embodiments, the required transmission power may be determined based on the transmit power control command only (e.g. if the transmit power control command indicates an absolute power level). In some embodiments, the required transmission power may be determined as the transmission power used for the most recent request signal (i.e. no transmit power control command is needed).

Alternatively or additionally to the estimation of the required transmission power in 230, a required energy for transmission of the data may be estimated in a similar manner as has been described in connection to FIG. 1.

A determination of whether or not to transmit the data is performed in 250, possibly based on optional steps 240 and 245. Operations of 240, 245 and 250 are similar to the operations of 140, 145 and 150 respectively and will not be described further.

If a threshold is applied in 250, the threshold may have the same or a different value compared to the threshold as has been described in connection to 150 of FIG. 1.

Responsive to a determination in 250 that data should not be transmitted, e.g. if the metric falls on a particular side of the threshold (NO (N) path out from 250), the decision regarding transmission of the data is postponed. For example, when the metric is equal to the estimated required power or energy, the decision is postponed if the metric exceeds the threshold.

Responsive to a determination in 250 that data should be transmitted, e.g. if the metric does not fall on the particular side of the threshold (YES (Y) path out from 250), this is an indication that the required transmission power and/or energy is acceptable under the circumstances and the data (or part of it) is transmitted in 260 using the estimated required transmission power/energy.

Postponing the decision regarding transmission of the data threshold (YES path out from 227 and YES path out from 250) involves determining when it is time to re-evaluate the transmission conditions 270. This may occur at regular time intervals. The time intervals may be fixed or may be dynamic based on aging of data and/or energy availability.

If it is determined that it is not time to re-evaluate data transmission (NO path out from 270), the method is put on hold and waits until it is time to re-evaluate.

If it is determined that it is time to re-evaluate data transmission (YES path out from 270), the method returns to 220 to restart the request procedure.

Optionally, the pending time of the data may be used as a stop condition (275 and 276) in a similar manner as has been described in connection to 175 and 176 of FIG. 1.

In some embodiments, the method includes determining and updating the required transmission effort statistics. For example, the statistics may be updated when a new required transmission effort value has been determined, 280, 281.

Parts of the method of FIG. 2 may be executed in 160 of FIG. 1 as has been indicated above. Thus, the initiation of data transmission in 160 may comprise initiating the transmission by performing a request procedure to transmit the data.

In such an embodiment the execution of 160 may comprise execution of the method 200 except for 210.

The initial transmission power setting of 220 may comprise setting the initial transmission power to the estimated transmission power of 130 or to a predetermined value.

The threshold of 250 (when applicable) may be the same or different that the threshold of 150 in these embodiments. For example, the threshold of 250 may be stricter (e.g. lower) than the threshold of 150 to allow the request procedure to start even if the required transmission effort (e.g. power and/or energy) is not as low as desired and avoid that the actual data transmission is started if the required transmission effort (e.g. power and/or energy) is not as low as desired. This approach may be applicable to a situation where the estimation in 130 is not as reliable as the further estimation in 230.

In the embodiments where parts of the method 200 are executed in 160, postponing the decision regarding transmission of the data threshold (YES path out from 227 and NO path out from 250), may comprise execution of the steps 270, 275 and 276. Alternatively, the YES path out from 227 and the NO path out from 250 may lead directly to 170 of FIG. 1. The former approach may be particularly applicable if the re-evaluation interval of 270 is set to a lower value than the re-evaluation interval of 170. The latter approach is more power efficient since the estimation in FIG. 1 consumes very little energy and the estimation in FIG. 2 is not allowed to re-start if the condition in 150 is not re-fulfilled.

Figure 3:
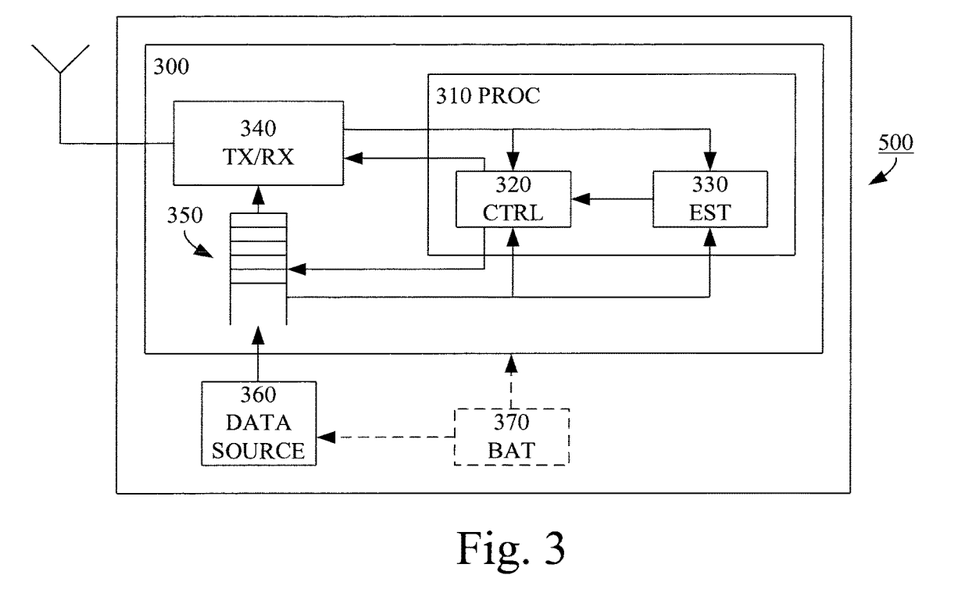
FIG. 3 is a block diagram illustrating an example arrangement according to some embodiments.

FIG. 3 is a schematic block diagram illustrating a wireless communication device 500 comprising an arrangement 300. The arrangement 300 comprises a processor or processor circuit 310 and a transceiver 340 connected to one or more antennas. The transceiver is associated with a data transmission buffer 350, which may, for example, be integral to or connected to the transceiver.

The transmission buffer 350 is fed by one or more data sources 360. In FIG. 3, the data source 360 is illustrated as external to the arrangement 300, but the data source(s) may or may not be comprised in the arrangement in various embodiments. Similarly, the data source 360 is illustrated as integral to the wireless communication device 500 in FIG. 3, but the data source(s) may or may not be comprised in the wireless communication device in various embodiments. The data source may, for example, be a sensor such as a temperature sensor, a battery level sensor, an overload sensor, etc.

The arrangement 300 and the data source(s) 360 are adapted to be powered by one or more (respective or shared) energy sources, for example, a battery 370, respective batteries, solar panels, etc.

The processor 310 comprises a controller 320 and an estimator 330. The controller 320 may receive input from the data buffer 350, e.g. to determine whether there is data pending for transmission and/or the age of the data. The controller 320 may send instructions to the transceiver 340, e.g. to cause the transceiver to receive or transmit signals and/or to inform it of the applicable transmission power. For example, the controller 320 is adapted to cause the transceiver to receive a signal (similarly to 120 of FIG. 1) and/or perform a random access request procedure (similarly to 220, 225, 226, 227, 228 of FIG. 2).

The estimator 330 may receive input from the transceiver 340, e.g. relating to a received power level and/or a received transmit power control command of the received signal. The estimator 330 may also receive input from the data buffer 350, e.g. relating to the size of data in the buffer.

The estimator 330 is adapted to use signals received by the transceiver 340 and possibly input from the data buffer 350 to estimate a required transmission effort. For example, the estimator 330 may estimate the required transmission effort according to 130 and/or 230 as described in connection with FIGS. 1 and 2 respectively. The estimator 330 is adapted to forward its transmission effort (power and/or energy) estimations to the controller 320.

Thus, the estimation provided by the estimator 330, is forwarded to the controller 320, which is adapted to use the estimation to make a determination regarding transmission of the data and to control the transceiver 340 accordingly. For example, the controller 320 may operate according to the methods (in particular 140, 145, 150, 170, 240, 245, 250, 270) as described in connection with FIGS. 1 and 2 respectively.

Furthermore, the controller 320 is adapted to cause the transceiver to transmit the data pending in the buffer (similarly to 160 of FIG. 1 and 260 of FIG. 2).

In applicable embodiments, the controller 320 is adapted to cause the buffer 350 to discard data that is older than a maximum age (similarly to 175, 176, 275, 276 of FIGS. 1 and 2 respectively). Thus, the controller 320 may send instructions to the data buffer 350, e.g. to cause the data buffer to discard data.

Furthermore, the controller 320 is adapted to determine whether data is pending in the data buffer 350 for transmission by the transceiver 340 (similarly to 110, 210 of FIGS. 1 and 2 respectively) and to determine when it is time for re-evaluation in case of postponement of a transmission decision (similarly to 170, 270 of FIGS. 1 and 2 respectively).

The described embodiments and their equivalents may be realised in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a portable or handheld mobile radio communication equipment, a mobile radio terminal, a mobile telephone, a base station, a pager, a communicator, an electronic organizer, a smartphone, a computer, a notebook, a USB-stick, a plug-in card, an embedded drive, a mobile gaming device, a modem, a sensor, a sensor hub or a (wrist) watch.

According to some embodiments of the invention, a computer program product comprises a computer readable medium such as, for example, a downloadable application, a diskette or a CD-ROM. The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in any of the FIG. 1 or 2 or a combination thereof.

Figure 4:
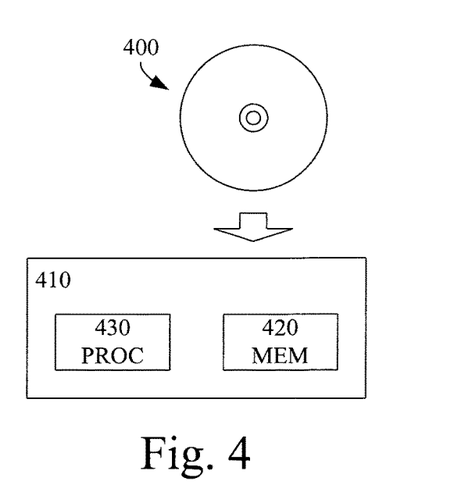
FIG. 4 is a schematic drawing illustrating a computer readable medium loadable into a data-processing unit according to some embodiments.

FIG. 4 illustrates a computer readable medium in the form of a CD-ROM 400. The CD-ROM is insertable into a data processing unit 410, which comprises a memory 420 and a data processor 430. When the CD-ROM 400 is inserted into the data processing unit 410, the computer program code stored thereon may be copied into the memory 420. Then the processor 430 may run the computer program from the memory 420. Alternatively, the processor 430 may run the computer program directly from the CD-ROM 400. The data processing unit 410 may be an implementation of the processor 310 of FIG. 3.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. For example, the transceiver 340 may be embodied as a transmitter and a receiver separately. In the same manner, functional blocks that are described herein as being implemented as two or more units may be implemented as a single unit without departing from the scope of the invention. For example, the controller and the estimator may be embodied as a single physical unit.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method of controlling data transmission of a transceiver comprising:
   determining that data is pending for transmission by the transceiver;
   receiving a signal;
   estimating a current required transmission effort for transmission of the data based on the received signal;
   determining a probability that a transmission effort for transmission of the data will be, at a future point in time within a time window, less than the estimated current required transmission effort, wherein the time window does not extend beyond a point in time at which an age of the data will be a maximum permissible age of the data, and
   wherein the probability is calculated based on required transmission effort statistics;
   initiating transmission of the data at the current time if the probability is lower than a first threshold; and
   postponing a decision of transmitting the data otherwise.

2. The method of claim 1, wherein estimating the current required transmission effort for transmission of the data based on the received signal comprises estimating a required transmission power for transmission of the data based on the received signal.

3. The method of claim 2, wherein estimating the required transmission power for transmission of the data based on the received signal comprises:
   measuring a received power of the received signal;
   estimating a path loss associated with reception of the signal based on the measured received power and a transmission power of the signal;
   estimating a path loss associated with transmission of the data based on the estimated path loss associated with reception of the signal; and
   estimating the required transmission power for transmission of the data based on the estimated path loss associated with transmission of the data.

4. The method of claim 2, wherein estimating the current required transmission effort for transmission of the data based on the received signal further comprises estimating a required transmission energy based on the estimated required transmission power and a size of the data pending for transmission.

5. The method of claim 1, wherein postponing the decision of transmitting the data comprises, at a subsequent point in time:
   receiving a subsequent signal;
   estimating a subsequent required transmission effort for transmission of the data based on the received subsequent signal;
   determining if data transmission is to be initiated based on a probability of experiencing a required transmission effort which is lower than the estimated subsequent required transmission effort without the age of the data exceeding the maximum permissible age of the data;
   initiating transmission of the data if it is determined that data transmission is to be initiated; and
   further postponing a decision of transmitting the data otherwise.

6. The method of claim 1, wherein initiating transmission of the data if the probability is lower than the first threshold comprises:
   setting an initial transmission power;
   transmitting a request signal using the initial transmission power;
   receiving a response signal relating to the request signal;
   estimating a new current required transmission effort for transmission of the data based on the received response signal;
   determining if the data is to be transmitted based on a probability of experiencing a required transmission effort which is lower than the estimated new current required transmission effort without the age of the data exceeding the maximum permissible age of the data;
   transmitting the data if it is determined that the data is to be transmitted; and
   postponing the decision of transmitting the data otherwise.

7. The method of claim 1, wherein postponing the decision of transmitting the data comprises, at a subsequent point in time, discarding data having a pending time exceeding a second threshold.

8. A non-transitory computer readable storage medium, having thereon a computer program comprising program instructions, the computer program being loadable into a data-processing unit associated with a transceiver and adapted to cause execution of a method of controlling data transmission of the transceiver when the computer program is run by the data-processing unit, wherein the method comprises:
   determining that data is pending for transmission by the transceiver;
   receiving a signal;
   estimating a current required transmission effort for transmission of the data based on the received signal;
   determining a probability that a transmission effort for transmission of the data will be, at a future point in time within a time window, less than the estimated current required transmission effort, wherein the time window does not extend beyond a point in time at which an age of the data will be a maximum permissible age of the data, and
   wherein the probability is calculated based on required transmission effort statistics;
   initiating transmission of the data at the current time if the probability is lower than a first threshold; and
   postponing a decision of transmitting the data otherwise.

9. A processor adapted to control data transmission of a transceiver, the processor comprising:
a controller adapted to:
cause the transceiver to receive a signal in response to a determination that data is pending for transmission by the transceiver;
determine a probability that a transmission effort for transmission of the data will be, at a future point in time within a time window, less than the estimated current required transmission effort, wherein the time window does not extend beyond a point in time at which an age of the data will be a maximum permissible age of the data, and
wherein the probability is calculated based on required transmission effort statistics;
initiate transmission of the data at the current time if the probability is lower than a first threshold; and
postpone a decision of transmitting the data otherwise; and
an estimator adapted to estimate the current required transmission effort for transmission of the data based on the received signal.

10. The processor of claim 9,
wherein the controller, to initiate transmission of the data if the probability is lower than the first threshold, is adapted to:
set an initial transmission power;
cause the transceiver to transmit a request signal using the initial transmission power;
cause the transceiver to receive a response signal relating to the request signal;
determine if the data is to be transmitted based on a probability of experiencing a required transmission effort which is lower than an estimated new current required transmission effort without the age of the data exceeding the maximum permissible age of the data;
cause the transceiver to transmit the data if it is determined that the data is to be transmitted; and
postpone the decision of transmitting the data otherwise; and
wherein the estimator is adapted to estimate the new current required transmission effort for transmission of the data based on the received response signal.

11. The processor of claim 9, wherein the controller is further adapted to cause discarding data having a pending time exceeding a second threshold.

12. The processor of claim 9, wherein the processor is part of an arrangement that comprises:
the transceiver; and
a data buffer adapted to buffer data pending for transmission by the transceiver.

13. The processor of claim 12, wherein the arrangement further comprises:
a data source adapted to provide data for transmission by the transceiver.

14. The processor of claim 12, wherein the arrangement is part of a wireless communication device.

* * * * *